March 22, 1949.  V. G. ERMITANO  2,465,077
GROUND SCRAPING AND LEVELING IMPLEMENT
Filed Jan. 29, 1947  2 Sheets-Sheet 1

Inventor
Valentin G. Ermitano

By Clarence A. O'Brien
and Harvey B. Jacobson
Attorneys

March 22, 1949. V. G. ERMITANO 2,465,077
GROUND SCRAPING AND LEVELING IMPLEMENT
Filed Jan. 29, 1947 2 Sheets-Sheet 2
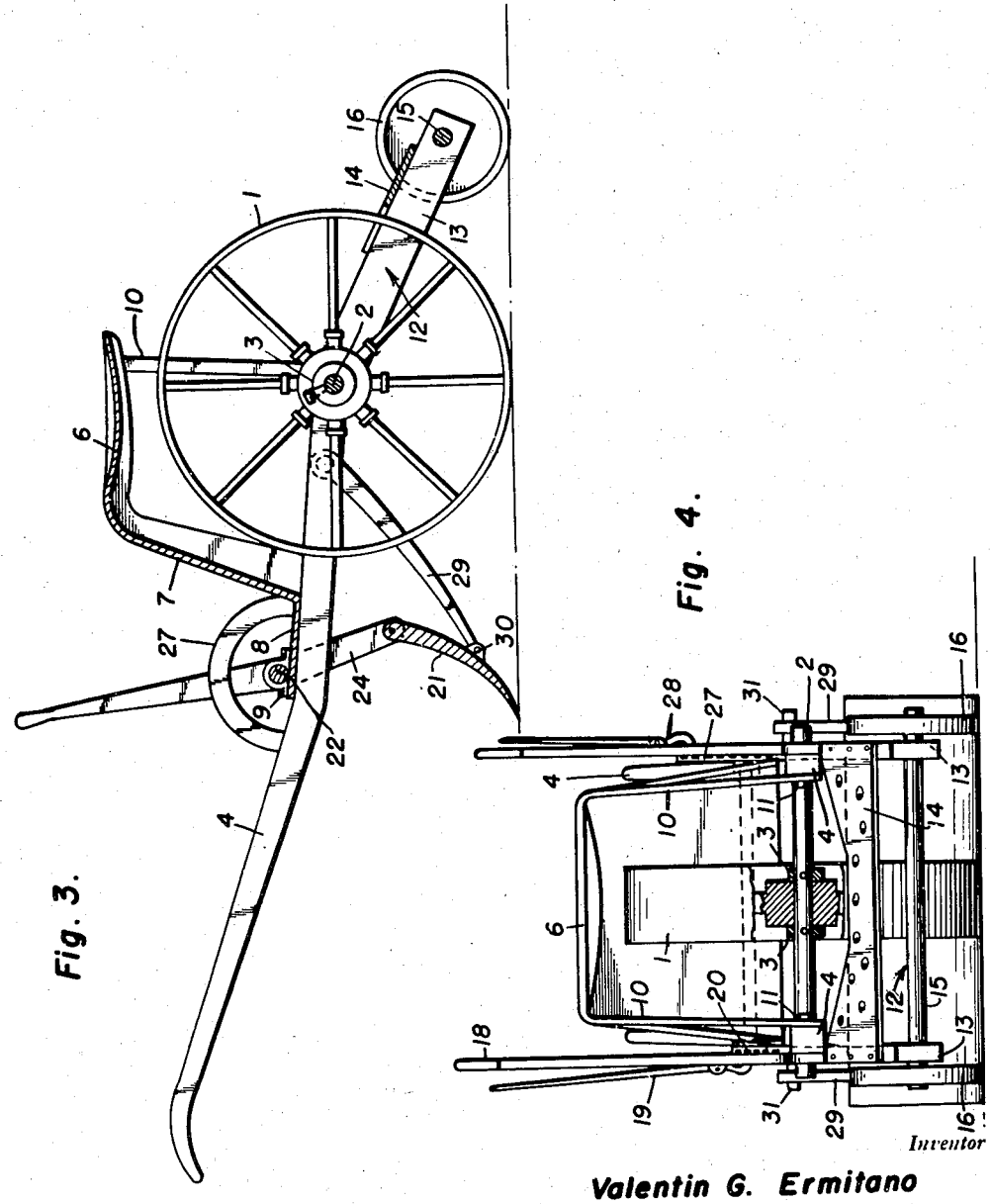
Inventor
Valentin G. Ermitano Patented Mar. 22, 1949

2,465,077

UNITED STATES PATENT OFFICE 2,465,077

GROUND SCRAPING AND LEVELING IMPLEMENT

Valentin G. Ermitaño, Burgos, P. I.

Application January 29, 1947, Serial No. 725,070

3 Claims. (Cl. 37—180)

My invention relates to improvements in ground scraping and leveling implements for use in the field especially, although not necessarily.

The primary object of my invention is to provide a ground scraping and leveling implement of the transverse blade, wheeled type adapted for draft by a single draft animal and easy one-man control from a seat on the implement to scrape at selected depths, as desired.

Another object is to provide an implement of the character and for the purpose above set forth which is easy to dump, as regards releasing a load scraped up by the scraper blade, is light in weight, yet strong and durable, will not readily get out of order, and is comparatively inexpensive to manufacture and use.

Other and subordinate objects, also comprehended by my invention, together with the precise nature of my improvements, and the manifold advantages thereof, will be readily understood when the succeeding description and claims are read with reference to the drawings accompanying and forming part of this specification.

In said drawings:

Figure 3 is a view in longitudinal section taken on the line 3—3 of Figure 2; and Figure 4 is a view in rear elevation.

Figures 1, 2:
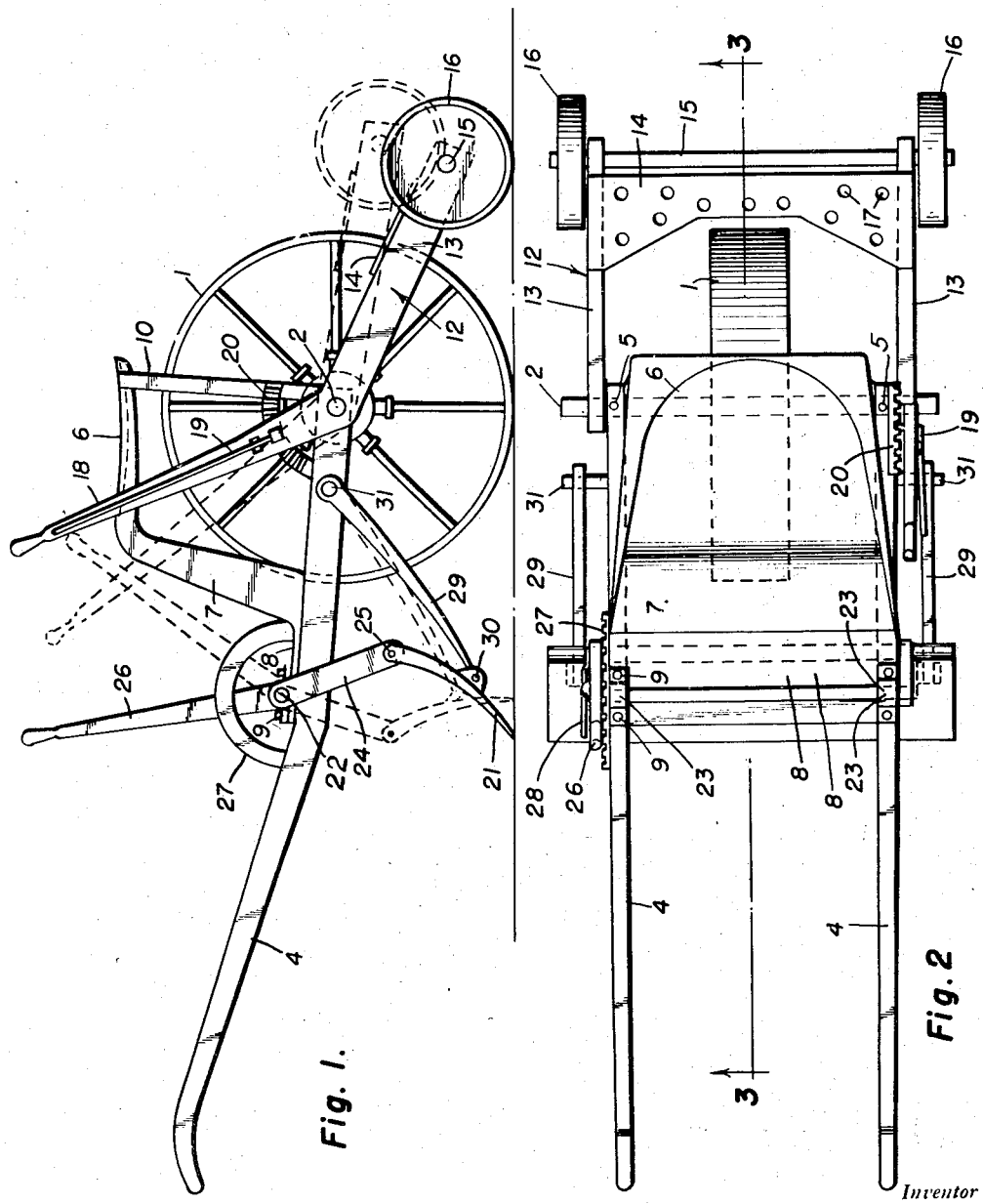
Figure 1 is a view in side elevation of my improved scraping and leveling implement in a preferred embodiment thereof.
Figure 2 is a view in plan.

Referring now to the drawings by numerals, my improved scraping and leveling implement, as shown, comprises a bull-wheel 1, of broad flat tread construction, preferably, and any suitable diameter, and which is rotatably mounted on an axle shaft 2 in the transverse center of said shaft between a pair of set-collars 3 on the shaft.

A pair of shafts 4 for a single draft animal, not shown, is suitably fixed on the axle shaft 2 adjacent opposite ends thereof, as by pins 5, said shafts being equi-distantly spaced from the bull-wheel 1 upon opposite sides of the same.

A driver's seat 6 extends rearwardly over the bull-wheel 1 and is supported by a front riser 7 upstanding from the rear edge of a foot rest platform 8 extending across the pair of shafts 4 in front of said bull-wheel and bolted to said shafts 4, as at 9. The seat 6, riser 7 and platform 8 comprise a single piece structure which may be formed of any lightweight strong material. Suitable brace bars 10 extend between the seat 6 and the pair of shafts 4 and are bolted thereto, as at 11.

A wheeled stabilizing truck 12 is provided for trailing the axle shaft 2. The stabilizing truck 12 comprises a pair of side arms 13 pivotally mounted on the axle shaft 2, outwardly of and along side the pair of shafts 4, and extending rearwardly of the bull-wheel 1, a cross plate 14 connecting said side arms 13 adjacent rear ends of said arms, an axle bar 15 extending through said rear ends of the side arms 13, and a pair of small ground wheels 16 on the ends of the axle bar 15. The cross plate 14 is preferably perforated, as at 17, to obviate collection of dust thereon. As will be clear, the stabilizing truck 12 straddles the bull-wheel 1 and is vertically swingable on the axle shaft 2 to raise the ground wheels 16 off the ground and to lower the same thereon.

A truck swinging hand lever 18 is formed on one side arm 13 to extend upwardly therefrom radially of the axle shaft 2 for forward and rearward swinging along side the seat 6 and is provided with the usual detent 19 for co-acting with a toothed sector 20 on the adjacent shaft 4 to hold said lever in different positions.

A concave scraper blade 21, of any usual type, extends across the bull-wheel 1 forwardly thereof. The scraper blade 21 is suspended in upright position from a rock shaft 22 extending across the platform 8 and journaled in suitable bearings 23 on said platform. The scraper blade 21 is suspended from the rock shaft 22 by a pair of crank arms 24 fast at upper ends thereof on the ends of the rock shaft 22 and depending from said shaft along side the outer sides of the pair of shafts 4 with lower ends pivoted to the upper corners of the scraper blade 21 by pivot pins 25 extending parallel to the rock shaft 22, so that said blade is swingable on the crank arms 24 about aligned axes parallel to that of the rock shaft 22.

A shaft rocker hand lever 26 is suitably fixed on one end of the rock shaft 22 in upstanding position for swinging forwardly and rearwardly along side a toothed sector 27 arising from the platform 8 and adapted to be engaged by the usual detent 28 on said lever to held the lever in different positions. As will be observed, the shaft rocker hand lever 26 is within convenient reach of a driver on the seat 6.

A pair of push arms 29 for the scraper blade 21 extend from said blade, adjacent opposite ends of the same, and are inclined upwardly and rearwardly from said blade to the pair of shafts 4 with front ends pivoted to said blade 21, as at 30, and rear ends pivoted to said pair of shafts 4, as at 31, said pivots 30, 31 providing for vertical swinging of said push arms 29. Preferably the pivots 30 are arranged well below the pivots 25 for a purpose presently seen.

Referring now to the operation of the described implement. With the shaft rocking hand lever 26 inclined slightly forwardly from the vertical, and the pair of shafts 4 in upswung position suitable for harnessing a draft animal, not shown, between the same, the crank arms 24 incline downwardly and rearwardly from the rock shaft 22, and the scraper blade 21 inclines downwardly and forwardly from the crank arms 24 in position to scrape the ground. Now, with the stabilizing truck 12 swung downwardly to engage the ground wheels 16 with the ground, if the implement is pulled forwardly, the scraper blade 21 will be pushed forwardly by the push arms 29 and the crank arms 24 for scraping to a uniform depth, all as shown in Figure 1. However, if it is desired to scrape deeper at one side of the implement than at the other, the stabilizing truck 12 may be swung upwardly, by swinging of the truck swinging hand lever 18 forwardly, as shown in dotted lines in Figure 1, to thereby lift the ground wheels 16 off the ground. The driver may then throw his weight to the appropriate side of the implement to cause the same to tilt sidewise on the bull-wheel 1, toward the side at which deeper scraping is desired, thus forcing the scraper blade 21 deeper into the ground at said side of the implement. By swinging the shaft rocking hand lever 26 rearwardly sufficiently, for instance as shown in dotted lines in Figure 1, to lift the scraper blade 21 above the ground, said blade will release the load scraped up by the same. Obviously, the scraper blade 21 may be caused to scrape at selected depths by varying the position of the shaft rocking hand lever 26 so as to elevate or lower said scraper blade, and said blade may be elevated clear of the ground sufficiently to render the same idle when it is desired to move the implement from place to place. A particular feature of my invention is that when the scraper blade 21 is adjusted, as described, into load releasing, or dumping position, the pressure of the load below the pivots 30 of the push arms 29 will tend to swing said blade into a downwardly and rearwardly inclined position so as to facilitate releasing the load. This occurs because pressure rearwardly on the scraper blade 21 below the pivots 30 causes said blade to swing on said pivots thus tending to swing the crank arms 24 forwardly and upwardly which tends to raise the scraper blade and the push arms 29 all so that the scraper blade 21 is swung by said arms 24 and 29 toward a horizontal position.

The foregoing will, it is believed, suffice to impart a clear understanding of my invention, without further explanation.

Manifestly, the invention, as described, is susceptible to modifications, without departing from the inventive concept, and right is herein reserved to such modifications as fall within the scope of the appended claims.

I claim:

1. In an implement of the class described, a pair of shafts for a draft animal, a ground engaging bull-wheel rotatably mounted between the rear ends of said pair of shafts, a scraper blade in front of said bull-wheel extending transversely of the same, means suspending said blade from said shafts and operative to raise and lower said blade, and a wheeled stabilizing truck trailing said bull-wheel and swingable about the axis of said bull-wheel into ground engaging position to prevent tilting of the implement and being swingable about said axis out of ground-engaging position to permit tilting of the implement, and manipulative means for swinging said truck.

2. In an implement of the class described, a pair of shafts for a draft animal, a ground engaging bull-wheel rotatably mounted between the rear ends of said pair of shafts, a scraper blade in front of said bull-wheel extending transversely of the same, means suspending said blade from said shafts and operative to raise and lower said blade, a wheeled stabilizing truck trailing said bull-wheel and swingable about the axis of said bull-wheel into ground engaging position to prevent tilting of the implement and being swingable about said axis out of ground-engaging position to permit tilting of the implement, manipulative means for swinging said truck, the first mentioned means comprising a rock shaft mounted on said pair of shafts, crank arms in said rock shaft pivotally connected to said scraper blade, and a lever for rocking said rock shaft.

3. In an implement of the class described, a pair of shafts for a draft animal, a ground engaging bull-wheel rotatably mounted between the rear ends of said pair of shafts, a scraper blade in front of said bull-wheel extending transversely of the same, means suspending said blade from said shafts and operative to raise and lower said blade, a wheeled stabilizing truck trailing said bull-wheel and swingable about the axis of said bull-wheel into ground engaging position to prevent tilting of the implement and being swingable about said axis out of ground-engaging position to permit tilting of the implement, manipulative means for swinging said truck, the first mentioned means comprising a rock shaft mounted on said pair of shafts, crank arms in said rock shaft pivotally connected to said scraper blade, a lever for rocking said rock shaft, and push arms pivotally connected to said blade and said pair of shafts.

VALENTIN G. ERMITAÑO.

No references cited.

Certificate of Correction

March 22, 1949

Patent No. 2,465,077

VALENTIN G. ERMITAÑO

It is hereby certified that errors appear in the above numbered patent requiring correction as follows:

In the grant, line 3, address of inventor, for "Burgos, Philippine Islands" read *Burgos, Pangasinan, Philippine Islands*; and in the heading to the printed specification, line 4, for "Burgos, P. I." read *Burgos, Pangasinan, P. I.*; and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*